US012152625B2

(12) United States Patent
Ashida et al.

(10) Patent No.: US 12,152,625 B2
(45) Date of Patent: Nov. 26, 2024

(54) FIXTURE

(71) Applicant: KAWASAKI RAILCAR MANUFACTURING CO., LTD., Kobe (JP)

(72) Inventors: Ryosuke Ashida, Kobe (JP); Takahiro Kawashima, Kobe (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 295 days.

(21) Appl. No.: 17/714,223

(22) Filed: Apr. 6, 2022

(65) Prior Publication Data

US 2022/0228621 A1 Jul. 21, 2022

Related U.S. Application Data

(63) Continuation of application No. PCT/JP2020/028304, filed on Jul. 21, 2020.

(30) Foreign Application Priority Data

Oct. 18, 2019 (JP) .................................. 2019-190657

(51) Int. Cl.
*F16B 37/04* (2006.01)
*F16B 39/02* (2006.01)
(52) U.S. Cl.
CPC ............ *F16B 37/046* (2013.01); *F16B 39/02* (2013.01)
(58) Field of Classification Search
CPC ....... F16B 37/046; F16B 39/02; F16M 11/00; F16M 13/00; F16M 2200/00
See application file for complete search history.

(56) References Cited

U.S. PATENT DOCUMENTS

| 6,224,136 | B1 * | 5/2001 | Takagi | ..................... B60J 10/70 |
| | | | | 296/84.1 |
| 8,413,299 | B2 * | 4/2013 | Bartels | .................. E05D 7/0423 |
| | | | | 16/236 |
| 9,586,670 | B2 * | 3/2017 | Markmiller | .............. B60J 1/007 |
| 10,246,918 | B2 * | 4/2019 | Friz | ........................ E05D 7/0027 |
| 2003/0010867 | A1 * | 1/2003 | Wojatschek | .......... B64C 1/1492 |
| | | | | 244/129.2 |

(Continued)

FOREIGN PATENT DOCUMENTS

| JP | H06-62057 B2 | 8/1994 |
| JP | H08-207761 A | 8/1996 |
| JP | 2015-164841 A | 9/2015 |

*Primary Examiner* — Monica E Millner
(74) *Attorney, Agent, or Firm* — Oliff PLC

(57) ABSTRACT

A fixture of the present disclosure includes: a first fitting fixed to a first object; a second fitting fixed to a second object; and a positioning bolt fixing a position of the second fitting relative to the first fitting. The first fitting includes: a cylindrical portion extending in a z direction and including a first elongated hole on an outer peripheral surface of the cylindrical portion, the first elongated hole extending in a circumferential direction; a shaft that turns inside the cylindrical portion and includes a screw hole corresponding to the positioning bolt; and a first fixing portion to which the first object is fixed. The second fitting includes: a movable portion including a second elongated hole extending in an x direction and through which the positioning bolt penetrates; and a second fixing portion to which the second object is fixed.

6 Claims, 7 Drawing Sheets

(56) References Cited

U.S. PATENT DOCUMENTS

2013/0327912 A1\* 12/2013 Yoshida ............... F16M 13/022
  248/289.11
2015/0232169 A1  8/2015 Markmiller
2019/0100284 A1\* 4/2019 Oakes .................... F16B 5/008

\* cited by examiner

FIXTURE

CROSS-REFERENCE TO RELATED APPLICATION

The present application is a bypass continuation of PCT Filing PCT/JP2020/028304, filed Jul. 21, 2020, which claims priority to JP 2019-190657, filed Oct. 18, 2019, both of which are incorporated by reference in their entirety.

BACKGROUND OF THE INVENTION

1. Field of the Invention

The present disclosure relates to a fixture.

2. Description of the Related Art

Generally, there are cases where an object is attached to another object, such as a case where a part is fixed or arranged at an appropriate position. For example, a process of manufacturing a railcar includes a step of attaching window glass having a curved surface corresponding to the shape of a carbody to the carbody (see Japanese Laid-Open Patent Application Publication No. 8-207761, for example). When the shapes of the carbody and the window glass are complicated, it is difficult to produce the carbody and the window glass with a high degree of accuracy, and therefore, contact surfaces of these do not necessarily coincide with each other. Therefore, it is necessary to perform such position adjustment that the contact surfaces of these are brought into contact with each other in as wide a range as possible by, for example, inserting a spacer into a gap generated between the carbody and the window glass, the spacer having an angle and a thickness which are the same as those of the gap.

SUMMARY OF THE INVENTION

A fixture according to one aspect of the present disclosure is a fixture, assuming that three orthogonal directions thereof are an x direction, a y direction, and a z direction, the fixture including: a first fitting fixed to a first object; a second fitting fixed to a second object, an attaching angle of the second fitting to the first fitting and the first object being adjustable; and at least one positioning bolt fixing a position of the second fitting relative to the first fitting. The first fitting includes a cylindrical portion extending in the z direction and including a first elongated hole on an outer peripheral surface of the cylindrical portion, the first elongated hole extending in a circumferential direction and through which the positioning bolt penetrates, a shaft that turns inside the cylindrical portion and includes a screw hole corresponding to the positioning bolt, and a first fixing portion to which the first object is fixed. The second fitting includes a movable portion including a second elongated hole which corresponds to the first elongated hole and extends in the x direction and through which the positioning bolt penetrates and a second fixing portion to which the second object is fixed. Position adjustment of the first fitting relative to the second fitting about a z-axis extending in the z direction is performed by the positioning bolt and the first elongated hole. Position adjustment of the first fitting relative to the second fitting in the x direction is performed by the positioning bolt and the second elongated hole. Position adjustment of the first fitting relative to the second fitting about a y-axis is performed by the positioning bolt and the second elongated hole.

DESCRIPTION OF THE PREFERRED EMBODIMENTS

Figure 1:
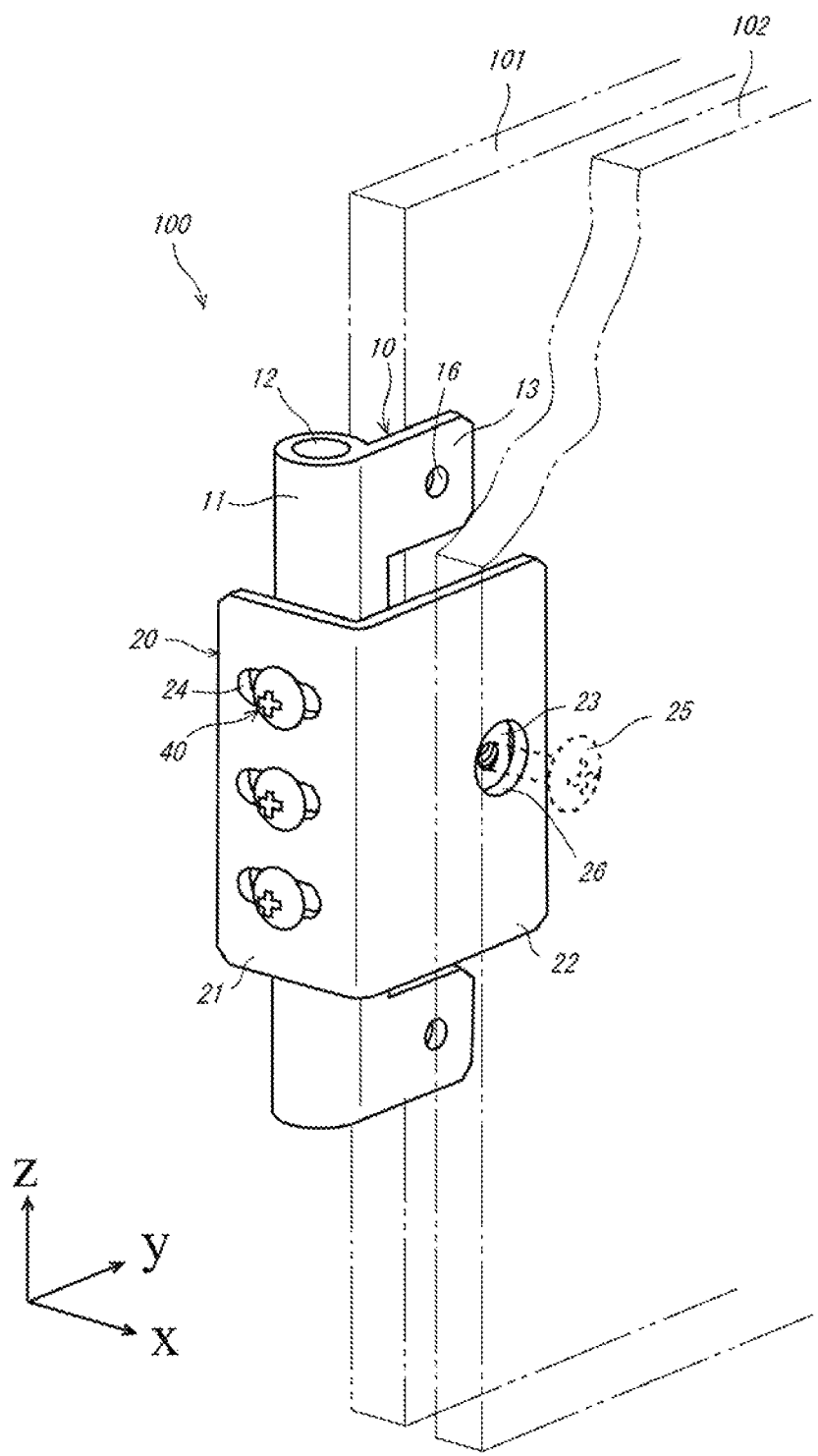
FIG. 1 is a perspective view of a fixture when viewed from a direction.
Figure 2:
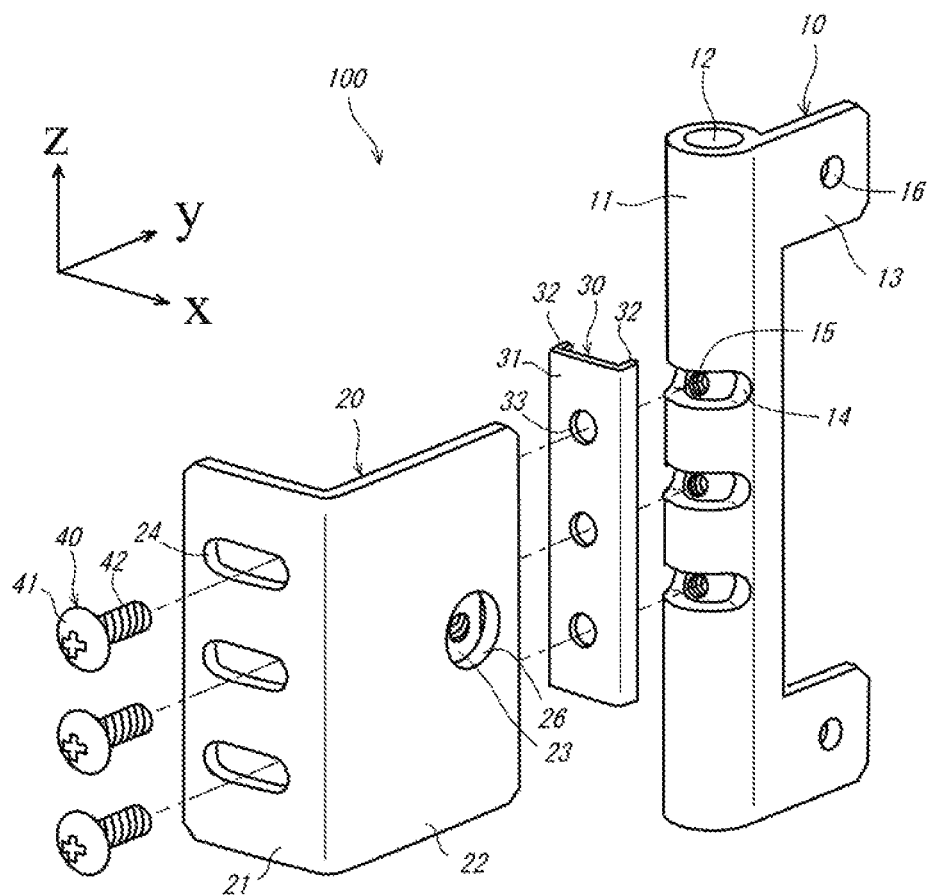
FIG. 2 is an exploded perspective view of the fixture when viewed from the direction.
Figure 3:
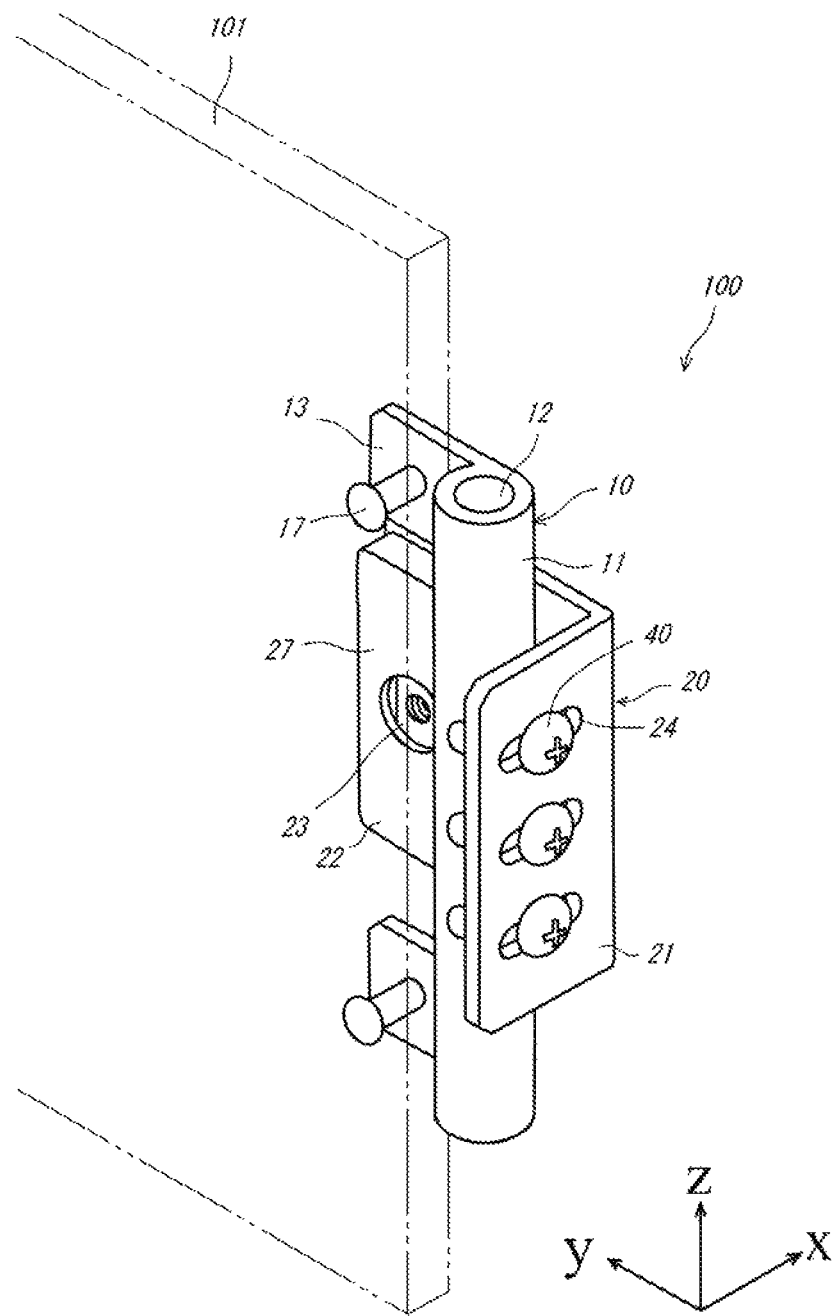
FIG. 3 is a perspective view of the fixture when viewed from another direction.
Figure 4:
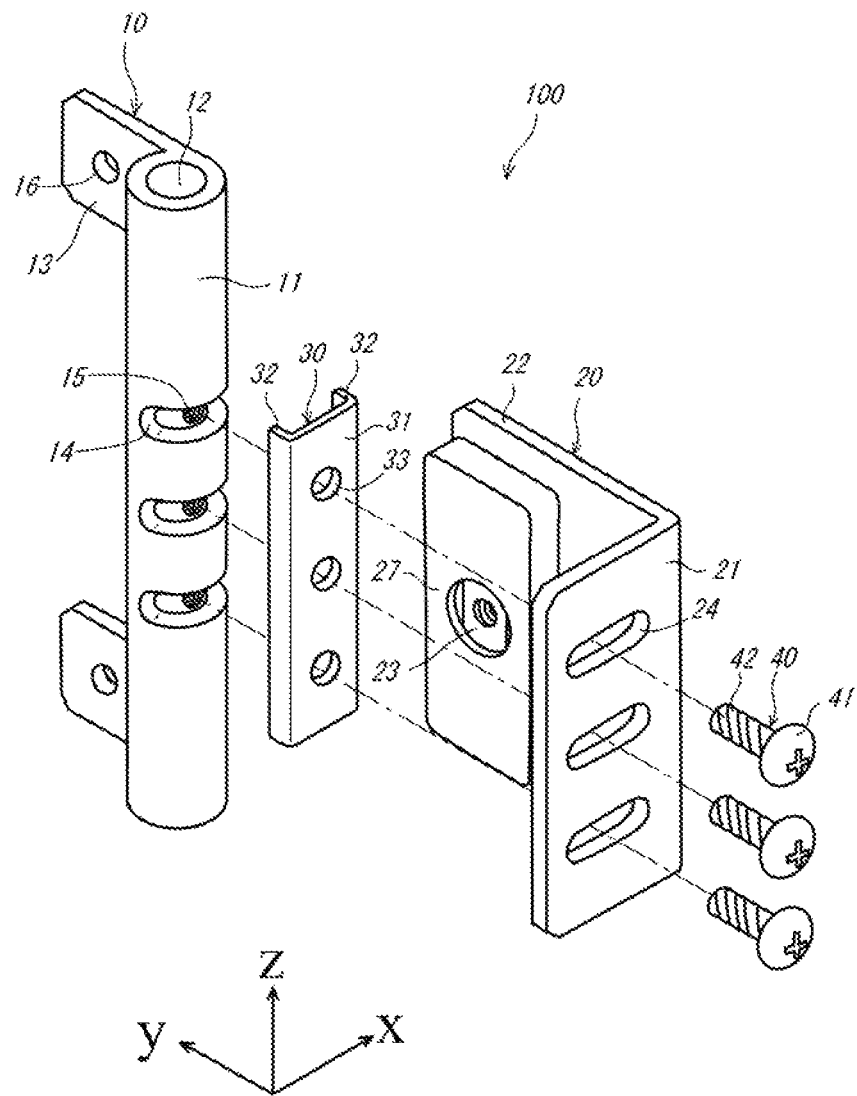
FIG. 4 is an exploded perspective view of the fixture when viewed from the another direction.

Hereinafter, a fixture 100 according to an embodiment will be described. FIG. 1 is a perspective view of the fixture 100 when viewed from a direction. FIG. 2 is an exploded perspective view of the fixture 100 when viewed from the direction. FIG. 3 is a perspective view of the fixture 100 when viewed from another direction. FIG. 4 is an exploded perspective view of the fixture 100 when viewed from the another direction. An x direction, a y direction, and a z direction described below are directions perpendicular to each other.

The fixture 100 according to the present embodiment is a part by which a second object 102 is attached to a first object 101 (see FIG. 1). As shown in FIG. 2, the fixture 100 includes a first fitting 10, a second fitting 20, a third fitting 30, and positioning bolts 40. Hereinafter, these components will be described in order.

First Attaching Part

The first fitting 10 is a part fixed to the first object 101. The first fitting 10 includes a cylindrical portion 11, a shaft 12, and a first fixing portion 13.

The cylindrical portion 11 has a cylindrical shape and extends in the z direction. An outer peripheral surface of the cylindrical portion 11 includes at least one first elongated hole 14 (in the present embodiment, three first elongated holes 14) extending in a circumferential direction. The first elongated holes 14 are arranged at intervals in the z direction.

The shaft 12 is a member that turns inside the cylindrical portion 11. The shaft 12 includes screw holes 15 at positions corresponding to the first elongated holes 14. The screw holes 15 include screw threads therein, and the positioning bolts 40 are fastened to the screw threads.

The first fixing portion 13 is a plate-shaped portion that is continuous with the cylindrical portion 11. As shown in FIG. 3, the first object 101 is fixed to the first fixing portion 13. The first fixing portion 13 includes a hole 16 (see FIG. 2), and the first object 101 is fixed to the first fixing portion 13 by a rivet 17 inserted into the hole 16. The first object 101 may be fixed to the first fixing portion 13 by a method other than rivet fastening, for example, by using a bolt instead of the rivet 17.

Second Attaching Part

The second fitting 20 is a part to which the second object 102 is fixed. An attaching angle of the second fitting 20 to the first fitting 10 and the first object 101 is adjustable. The second fitting 20 includes a movable portion 21, a second fixing portion 22, and a floating nut 23.

The movable portion 21 is a portion attached to the first fitting 10 so as to be turnable relative to the first fitting 10. The movable portion 21 of the present embodiment has a plate shape and includes second elongated holes 24. The second elongated holes 24 are arranged so as to correspond to the first elongated holes 14 of the first fitting 10. The second elongated holes 24 extend in the x direction.

The second fixing portion 22 is a portion to which the second object 102 is fixed. The second fixing portion 22 of the present embodiment has a plate shape. The second fixing portion 22 is continuous with the movable portion 21 and has an angle of 90 degrees to the movable portion 21. With this, the entire second fitting 20 has an L shape. The angle between the movable portion 21 and the second fixing portion 22 does not have to be 90 degrees, and the movable portion 21 and the second fixing portion 22 may be located on the same plane.

The floating nut 23 is a nut disposed at the second fixing portion 22. As shown in FIG. 1, the second object 102 is fixed to the second fixing portion 22 by using a fixing bolt 25. The fixing bolt 25 penetrates a through hole 26 located at the second fixing portion 22 and is fastened to the floating nut 23. As shown in FIG. 4, the floating nut 23 is accommodated in a casing 27 having an internal space and can move in parallel with the second fixing portion 22. To be specific, the floating nut 23 can move on a plane defined by the y direction and the z direction. The floating nut 23 is not limited to the above structure as long as the floating nut 23 is movable on the plane defined by the y direction and the z direction.

Since the floating nut 23 is configured as above, the second object 102 is turnable relative to the second fitting 20 about an x-axis extending in the x direction and is movable in the x direction and the z direction. Then, by tightening the fixing bolt 25, the relative positions of the second fitting 20 and the second object 102 can be fixed. Moreover, by loosening the fixing bolt 25, the movement of the second object 102 relative to the second fitting 20 can be allowed.

Third Attaching Part

The third fitting 30 is a part located between the cylindrical portion 11 of the first fitting 10 and the movable portion 21 of the second fitting 20. The third fitting 30 includes: a plate-shaped main body 31 extending in the z direction; and a pair of legs 32 which extend from both x-direction end portions of the main body 31 toward the cylindrical portion 11 of the first fitting 10. The main body 31 includes communication holes 33 at positions corresponding to the first elongated holes 14 of the first fitting 10.

Figure 5:
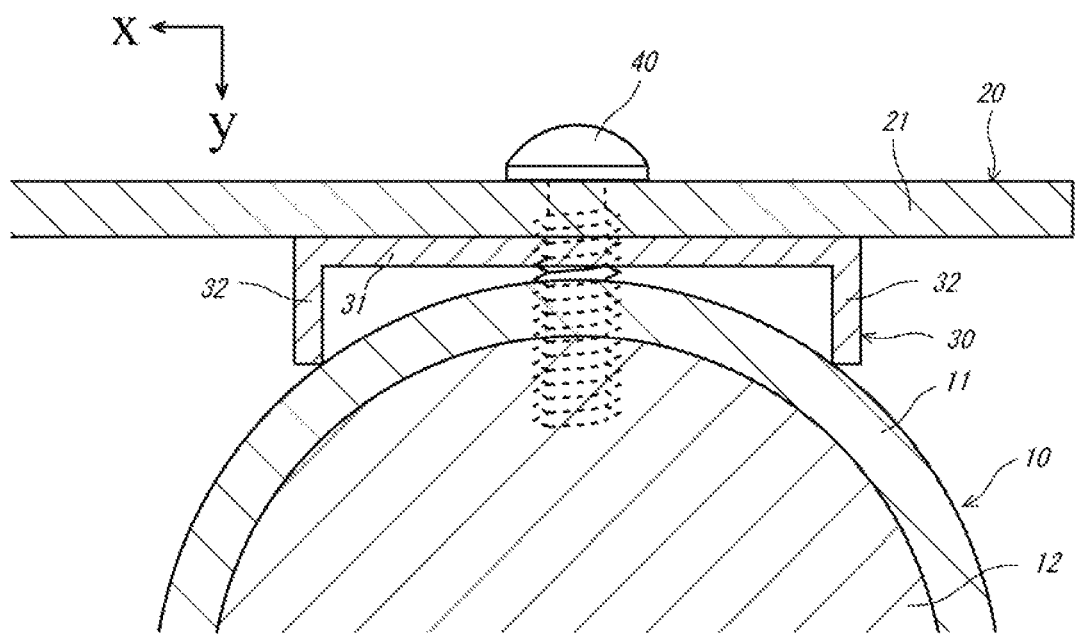
FIG. 5 is a sectional view showing a third fitting and its peripheral parts.

FIG. 5 is a sectional view showing the third fitting 30 and its peripheral parts. As shown in FIG. 5, the main body 31 of the third fitting 30 is in surface contact with the movable portion 21, and the pair of legs 32 of the third fitting 30 are in line contact with the outer peripheral surface of the cylindrical portion 11. To be specific, in a sectional view perpendicular to the z direction, the third fitting 30 is in point contact with the first fitting 10 at two positions. Since the third fitting 30 is arranged between the first fitting 10 and the second fitting 20, the second fitting 20 can be held by the first fitting 10 more stably than when the plate-shaped second fitting 20 is in direct contact with the cylindrical first fitting 10. In a sectional view perpendicular to the z direction, the third fitting 30 may be in point contact with the first fitting 10 at three or more positions or may have an arc shape and be continuously in contact with the first fitting 10.

Figure 6:
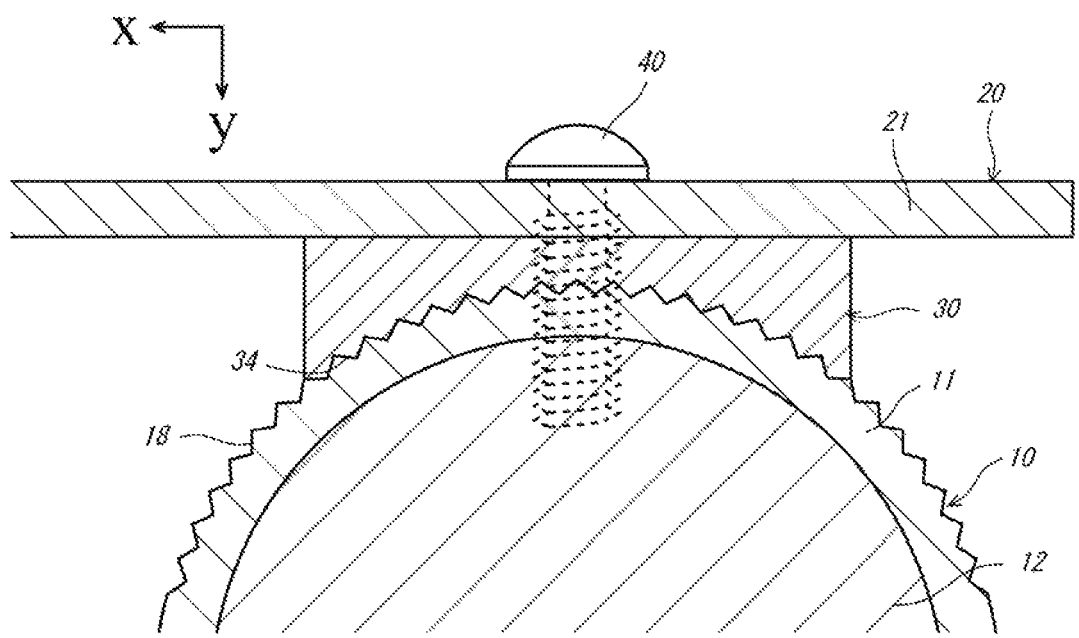
FIG. 6 is a sectional view showing the third fitting and its peripheral parts in Modified Example 1.

FIG. 6 is a sectional view showing the third fitting 30 and its peripheral parts in Modified Example 1. The third fitting 30 may be configured as shown in FIG. 6. To be specific, the outer peripheral surface of the cylindrical portion 11 of the first fitting 10 may include outer peripheral grooves 18 extending in the z direction, and a portion of the third fitting 30 which portion is in contact with an outer peripheral surface of the first fitting 10 may include inner peripheral grooves 34 corresponding to the outer peripheral grooves 18. According to this configuration, a positioning error of the second fitting 20 with respect to the first fitting 10 can be further suppressed.

Figure 7:
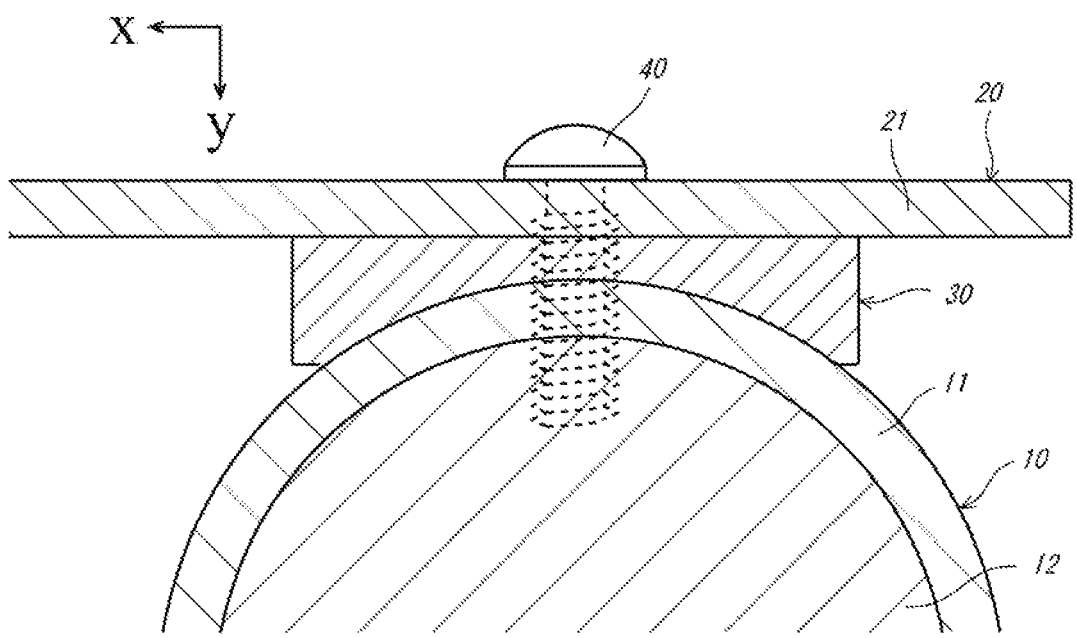
FIG. 7 is a sectional view showing the third fitting and its peripheral parts in Modified Example 2.

FIG. 7 is a sectional view showing the third fitting 30 and its peripheral parts in Modified Example 2. The third fitting 30 may be configured as shown in FIG. 7. To be specific, the portion of the third fitting 30 which portion is in contact with the outer peripheral surface of the first fitting 10 may have a curved shape, and in a sectional view perpendicular to the z direction, the third fitting 30 may be in line contact with the first fitting 10. In other words, the third fitting 30 may be in surface contact with the first fitting 10.

Positioning Bolt

The positioning bolt 40 is a bolt that fixes the relative position of the second fitting 20 relative to the first fitting 10. The positioning bolt 40 includes: a head portion 41 having an outer diameter larger than a dimension of the second elongated hole 24 in the z direction; and a screw portion 42 having an outer diameter smaller than the dimension of the second elongated hole 24 in the z direction. The positioning bolt 40 penetrates the second elongated hole 24, the communication hole 33, and the first elongated hole 14 and is fastened to the screw hole 15 of the shaft 12.

By tightening the positioning bolt 40, the second fitting 20 is pressed toward the first fitting 10, and the relative positions of the first fitting 10 and the second fitting 20 are fixed. In contrast, by loosening the positioning bolt 40, the second fitting 20 is movable relative to the first fitting 10.

Specifically, when the shaft 12 turns inside the cylindrical portion 11 of the first fitting 10, the positioning bolt 40 turns along the first elongated hole 14. With this, the second fitting 20 turns relative to the first fitting 10 about a z-axis. Herein, the z-axis is an axis that extends in the z direction and passes through a center axis of the shaft 12.

Moreover, since the second elongated hole 24 through which the positioning bolt 40 penetrates extends in the x direction, the second fitting 20 is movable in the x direction relative to the positioning bolt 40. Therefore, the second fitting 20 is movable relative to the first fitting 10 in the x direction. Furthermore, in the present embodiment, a dimension of the second elongated hole 24 in the z direction is much larger than the outer diameter of the screw portion 42 of the positioning bolt 40. Therefore, the second fitting 20 is turnable relative to the first fitting 10 about a y-axis extending in the y direction.

The fixture 100 according to the present embodiment includes three positioning bolts 40, but the number of positioning bolts 40 is not limited. For example, the fixture 100 may include only one positioning bolt 40. Moreover, each of the number of first elongated holes 14, the number of second elongated holes 24, and the number of communication holes 33 coincides with the number of positioning bolts 40. Therefore, for example, when the fixture 100 includes only one positioning bolt 40, each of the number of first elongated holes 14, the number of second elongated holes 24, and the number of communication holes 33 is one.

Operational Advantages, Etc.

As above, the fixture 100 according to the present embodiment is a fixture, assuming that three orthogonal directions thereof are an x direction, a y direction, and a z direction, the fixture 100 including: a first fitting 10 fixed to a first object 101; a second fitting 20 fixed to a second object 102, an attaching angle of the second fitting 20 to the first fitting 10 and the first object 101 being adjustable; and at least one positioning bolt 40 fixing a position of the second fitting 20 relative to the first fitting 10. The first fitting 10 includes a cylindrical portion 11 extending in the z direction and including a first elongated hole 14 on an outer peripheral surface of the cylindrical portion 11, the first elongated hole 14 extending in a circumferential direction and through which the positioning bolt 40 penetrates, a shaft 12 that turns inside the cylindrical portion 11 and includes a screw hole 15 corresponding to the positioning bolt 40, and a first fixing portion 13 to which the first object 101 is fixed. The second fitting 20 includes a movable portion 21 including a second elongated hole 24 which corresponds to the first elongated hole 14 and extends in the x direction and through which the positioning bolt 40 penetrates and a second fixing portion 22 to which the second object 102 is fixed. Position adjustment of the first fitting 10 relative to the second fitting 20 about a z-axis extending in the z direction is performed by the positioning bolt 40 and the first elongated hole 14. Position adjustment of the first fitting 10 relative to the second fitting 20 in the x direction is performed by the positioning bolt 40 and the second elongated hole. Position adjustment of the first fitting 10 relative to the second fitting 20 about a y-axis is performed by the positioning bolt 40 and the second elongated hole 24.

As above, in the fixture 100 according to the present embodiment, the second fitting 20 is complicatedly movable relative to the first fitting 10. In addition, the relative positions of the first fitting 10 and the second fitting 20 can be fixed only by tightening the positioning bolt 40 and can be unfixed by loosening the positioning bolt 40. Therefore, in the fixture 100 according to the present embodiment, the second object 102 to which the second fitting 20 is fixed is complicatedly movable relative to the first object 101 to which the first fitting 10 is fixed, and the relative positions of the objects 101 and 102 can be easily fixed or unfixed.

Moreover, in the fixture 100 according to the present embodiment, the second fitting 20 further includes the floating nut 23 to which the fixing bolt 25 is fastened, the fixing bolt 25 fixing the second fixing portion 22 to the second fitting 20. The position adjustment of the second fitting 20 relative to the second object 102 about the x-axis and in the y direction and the z direction is performed by the fixing bolt 25 and the floating nut 23.

As above, since the fixture 100 according to the present embodiment includes the floating nut 23, the second object 102 is further complicatedly movable relative to the first object 101.

Moreover, in the fixture 100 according to the present embodiment, the at least one positioning bolt 40 includes the positioning bolts 40. The cylindrical portion 11 includes the first elongated holes 14 at intervals in the z direction. The movable portion 21 includes the second elongated holes 24 corresponding to the first elongated holes 14. The positioning bolts 40 penetrate the corresponding first elongated holes 14 and the corresponding second elongated holes 24 and are fastened to the corresponding screw holes 15 of the shaft 12.

As above, since the fixture 100 according to the present embodiment includes the positioning bolts 40, the position adjustment of the second fitting 20 relative to the first fitting 10 can be performed more stably than when the fixture 100 includes only one positioning bolt 40. To be specific, the position adjustment of the second object 102 relative to the first object 101 can be more stably performed.

Moreover, the fixture 100 according to the present embodiment further includes the third fitting 30 located between the cylindrical portion 11 and the movable portion 21 and extending in the z direction. The third fitting 30 includes at least one communication hole 33 through which the positioning bolt 40 penetrates. In a sectional view perpendicular to the z direction, the third fitting 30 is in line contact with the outer peripheral surface of the cylindrical portion 11 or in point contact with the outer peripheral surface of the cylindrical portion 11 at at least two positions (see FIG. 5 to FIG. 7).

Therefore, in the fixture 100 according to the present embodiment, the second fitting 20 can be held by the first fitting 10 more stably than when the second fitting 20 is in direct contact with the first fitting 10.

Moreover, in the present embodiment, the third fitting 30 includes: the main body 31 including the communication hole 33; and the pair of legs 32 extending from the main body 31 toward the cylindrical portion 11. The pair of legs 32 are in contact with the outer peripheral surface of the cylindrical portion 11.

According to this configuration, the third fitting 30 can be easily formed.

Moreover, in the present embodiment, an angle between the second fixing portion 22 and the movable portion 21 is a predetermined angle, and the entire second fitting 20 has an L-shaped section.

According to this configuration, the second object 102 fixed to the second fixing portion 22 can be prevented from interfering with the positioning bolt 40. Therefore, the positioning bolt 40 can be easily tightened.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A fixture having an x direction, a y direction, and a z direction being orthogonal to each other, the fixture comprising:
   a first fitting fixed to a first object;
   a second fitting fixed to a second object and the first fitting, (i) a first attaching angle between the second fitting and the first fitting and (ii) a second attaching angle between the second fitting and the first object each being adjustable; and
   at least one positioning bolt fixing a position of the second fitting relative to the first fitting, wherein:
   the first fitting includes
      a cylindrical portion extending in the z direction and including a first elongated hole on an outer peripheral surface of the cylindrical portion, the first elongated hole extending in a circumferential direction of the cylindrical portion, the positioning bolt penetrating through the first elongated hole, a shaft configured to turn inside the cylindrical portion and includes a screw hole corresponding to the positioning bolt, and a first fixing portion to which the first object is fixed;

the second fitting includes a movable portion including a second elongated hole which corresponds to the first elongated hole and extends in the x direction, the positioning bolt penetrating through the second elongated hole, and a second fixing portion to which the second object is fixed;

the positioning bolt and the first elongated hole are configured for position adjustment of the first fitting relative to the second fitting about a z-axis extending in the z direction;

the positioning bolt and the second elongated hole are configured for position adjustment of the first fitting relative to the second fitting about an x-axis extending in the x direction; and the positioning bolt and the second elongated hole are configured for position adjustment of the first fitting relative to the second fitting about a y-axis extending in the y direction.

2. The fixture according to claim 1, wherein:

the second fitting further includes a floating nut to which a fixing bolt is fastened, the fixing bolt fixing the second fixing portion to the second object; and the fixing bolt and the floating nut are configured for position adjustment of the second fitting relative to the second object about the x-axis and in the y direction and the z direction.

3. The fixture according to claim 1, wherein:

the at least one positioning bolt comprises positioning bolts;

the cylindrical portion includes first elongated holes at intervals in the z direction;

the movable portion includes second elongated holes corresponding to the first elongated holes; and the positioning bolts penetrate the corresponding first elongated holes and the corresponding second elongated holes and are fastened to corresponding screw holes of the shaft.

4. The fixture according to claim 1, further comprising a third fitting located between the cylindrical portion and the movable portion and extending in the z direction, wherein:

the third fitting includes at least one communication hole through which the positioning bolt penetrates; and in a cross-sectional view perpendicular to the z direction, the third fitting is in line contact with an outer peripheral surface of the cylindrical portion or in point contact with the outer peripheral surface of the cylindrical portion at at least two positions.

5. The fixture according to claim 4, wherein:

the third fitting includes a main body including the communication hole and a pair of legs extending from the main body toward the cylindrical portion; and the pair of legs are in contact with the outer peripheral surface of the cylindrical portion.

6. The fixture according to claim 1, wherein:

an angle between the second fixing portion and the movable portion is a predetermined angle; and the entire second fitting has an L-shaped section.

* * * * *